Patented July 10, 1934

1,965,605

UNITED STATES PATENT OFFICE 1,965,605

REFRACTORY SYNTHETIC MAGNESIA PRODUCT AND PROCESS OF MAKING SAME

William J. McCaughey and Harley C. Lee, Columbus, Ohio, assignor, by mesne assignments, to Non-Metallic Minerals, Inc., Cleveland, Ohio, a corporation of Ohio No Drawing. Application March 14, 1930, Serial No. 435,972

4 Claims. (Cl. 106—9)

Naturally occurring magnesite is a mineral that has found wide-spread application for the manufacture of a basic refractory for metallurgical furnaces and for service where resistance to high temperature and corrosion by basic slags is desirable. Magnesite (magnesium carbonate) when calcined yields as its essential component magnesium oxide which when pure has a melting temperature of 2800° C. If given sufficiently prolonged heat treatment at a high temperature or melted in an electric furnace, crystals or MgO are formed known as periclase which have a specific gravity of 3.58. The pure magnesite when calcined and completely shrunk loses over 50% of its weight in carbon dioxide, forming periclase.

Complete shrinkage is manifested by the development of comparatively large and closely packed crystals of periclase (MgO) easily recognized in the product by their characteristic cubic cleavage and other optical properties as determined under a petrographic microscope. This transformation from magnesite to periclase would correspond to a maximum volume shrinkage of sixty percent.

It would be desirable to bring about shrinkage of this order in magnesite and obtain the consequent high degree of maturity developed by the formation of periclase at a temperature reasonably attainable in commercial kilns, without resorting to electric melting furnaces.

In the ordinary commercial process of calcining magnesite, it has been extremely difficult to obtain this complete shrinkage even when fluxes are added to complete the reaction, at a lower temperature than melting.

On account of its high melting temperature, pure MgO will not readily coalesce into a furnace bottom to become an integral part of the furnace, so there must be incorporated with it some coalescing medium of much lower melting temperature, which we find should at the same time be in chemical equilibrium with periclase, thus insuring some degree of permanence and not adversely affecting the MgO.

The present invention relates to new refractories devised to overcome these difficulties, and to the process of making the same. To the accomplishment of the foregoing and related ends the invention, then, consists of the steps and combination of ingredients hereinafter fully described and particularly pointed out in the claims, the specific examples given illustrating but a few of the various ways in which the principle of the invention may be utilized.

When using artificial promoters of mineral maturity, the impurities already present in the magnesite or artificial magnesia product must be considered and allowance made for their effect. Free magnesium oxide or periclase, because of its high melting temperature, (refractoriness), and its low solubility in basic silicate melts, is the most valuable constituent in this type of refractory, and therefor the flux addition should be of such a nature as not only to promote a high degree of maturity and to develop a strong coalescing power but to insure a large concentration of free MgO (periclase) to serve as the principal and most refractory constituent.

Iron oxide, aluminum oxide, and silicon dioxide, separately or in combination, have been considerably used heretofore for bonding magnesite refractories after removal of the carbon dioxide. The use of these oxides in amounts to combine with only a portion of the free MgO has in general produced a product incompletely shrunk, with a low degree of mineral maturity and with small coalescing power. The reason for this lies in the fact that the minerals produced by the reaction of $Fe_2O_3$, $Al_2O_3$, and $SiO_2$ with MgO are relatively infusible products with melting temperatures much higher than those attained in commercial furnaces. The fact that a high grade magnesite refractory should contain a large amount of free magnesium oxide (periclase) places a narrow limitation on the choice of fluxing compounds, and the fluxes added should be unusually effective in producing a low temperature bond that will at the same time be in chemical equilibrium with MgO.

The compounds of magnesia that form by reaction with $Al_2O_3$, $Fe_2O_3$ and $SiO_2$, and that can be in equilibrium with MgO are respectively $MgO.Al_2O_3$ (spinel) with melting temperature 2135° C., $MgO.Fe_2O_3$ (magnesioferrite), with a melting temperature about 1800° C., and $2MgO.SiO_2$ (forsterite), with melting temperature 1890° C. Iron oxide also passes into solid solution in periclase but does not produce any great effect in lowering its melting temperature. Both spinel and magnesioferrite cannot occur in the same refractory since they are end members in the spinel series and are likely to crystallize out to form a spinel of composition intermediate in composition between magnesioferrite and spinel. The silica, when used as a flux or where found as an impurity in the magnesite forms forsterite on heating, which segregates into large crystal groups, thus rendering the refractory non-uniform and likely to spall.

A suitable bond for magnesite refractories or magnesia we find is one which develops at a low temperature, which thus promotes early maturity of the periclase, and permits the use of a relatively small amount of bond, resulting therefore in a high concentration of periclase.

By the introduction of CaO (or compounds of calcium which yield CaO at high temperatures) as a flux with $Fe_2O_3$ and $Al_2O_3$ or mixtures of both, it is possible to form with $Fe_2O_3$ and $Al_2O_3$ compounds which melt at low temperatures, such compounds also being in equilibrium with periclase or free magnesium oxide. Since CaO is more active chemically than MgO, the calcium compounds will form, rather than the corresponding magnesium compounds. In fact, if compounds of magnesium are heated with sufficient free CaO, the magnesium compound is decomposed with the formation of the corresponding calcium compound and the separation of free MgO or periclase ($Mg_2SiO_4 + 2CaO = Ca_2SiO_4 + 2MgO$).

We have found that these compounds of $Fe_2O_3$ and $Al_2O_3$ with CaO form easily and at a low temperature and produce a mineral maturity in a magnesia refractory much more readily and at a lower temperature than other fluxing compounds. Because they melt so much lower than other bonding materials (around 1400° C.) they form an easily and evenly dispersed bonding medium, and therefore the refractory product will require less bond. Their use produces a more homogeneous refractory less subject to spalling effects.

In the development of such a bond, it should be understood that $Al_2O_3$ and $Cr_2O_3$ can function as a substitute for part of the $Fe_2O_3$, but on account of the valuable hardening qualities of the calcium ferrite bond it is not desirable to make such substitution in excess of one half of the $Fe_2O_3$.

The amount of CaO to be added will depend not only on the amount of $Fe_2O_3$, $Al_2O_3$ and $Cr_2O_3$ to be used but also on the amount of $SiO_2$ present in the magnesite as an impurity or added with the fluxing ingredients. In general, before CaO becomes available to form a ferrite or aluminate bond it must be added in amount equal to twice the amount of $SiO_2$ to be present in the final product.

The CaO, which is added because of the $SiO_2$ present, forms the refractory compound dicalcium silicate. This compound is formed before any ferrite is formed, the additional CaO added over this amount is then available for the formation of ferrite bond.

Sufficient CaO should be added to convert all the $SiO_2$ into dicalcium silicate and to react with the $Fe_2O_3$ and $Al_2O_3$ to form the ferrite bond. On account of the increased amount of CaO necessary to add to magnesite containing any appreciable amount of $SiO_2$, with the consequent dilution of the periclase and also because of the undesirable dusting reaction of refractories carrying dicalcium silicate, higher grades of periclase refractory would be produced by using magnesite or magnesia products containing only small amounts of $SiO_2$, preferably less than three percent. $SiO_2$ in the finished product.

The ferrite bond melts at an appreciably lower temperature in the presence of dicalcium silicate if the ratio of the $SiO_2$ to the $Fe_2O_3$ in the dicalcium silicate and ferrite is kept lower than 1 to 4, so that a small amount of silica may be beneficial in reducing the melting temperature of the bond. On the other hand, the possible destructive action due to the inversion of dicalcium silicate makes the presence of the latter, except in small quantities, undesirable.

The total amount of lime necessary for the periclase refractory will then include that required by the $SiO_2$ to form dicalcium silicate plus that available for reaction with $Fe_2O_3$ (plus $Al_2O_3$) to form a ferrite bond.

The proportion of available CaO to the total $Fe_2O_3$ (plus $Al_2O_3$) may vary, but the available CaO in general should not be less than four tenths of the total $R_2O_3$ nor exceed seven tenths of the total $Fe_2O_3$ (plus $Al_2O_3$) when the $R_2O_3$ is substantially all $Fe_2O_3$. When the $Fe_2O_3$ comprises six tenths of the total $R_2O_3$ present, the CaO should not exceed eighty six hundredths of the total $R_2O_3$. We have found no particular advantage accruing when the substitution of $Al_2O_3$ for the $Fe_2O_3$ exceeds four tenths of the total $R_2O_3$. In fact, beyond that limit the hardening qualities of the refractory in service are diminished and the bond becomes less fusible.

It is to be understood that the term ferrite includes not only compounds in which $Fe_2O_3$ is in combination with protoxides such as CaO, but also those compounds in which part of the $Fe_2O_3$ has been replaced by $Al_2O_3$ and $Cr_2O_3$, and that the term ferrite bond includes these compounds and also those bonds where calcium ferrite is the predominant constituent but which has fluxed with it a smaller amount of dicalcium silicate, in which latter case the bond may remain in large part uncrystallized as a basic glass.

In our work, we have found it possible to manufacture a satisfactorily well shrunk periclase refractory with as low a content of calcium ferrite as seven per cent. but quicker coalescence in service can be obtained with one containing 12 to 15 per cent. calcium ferrite. For special metallurgical purposes, the calcium ferrite content may be increased to 20 per cent.

Our improved process may be conveniently illustrated by describing its application to the treatment of magnesite yielding three per cent., or preferably less, silica in the finished product, or to a magnesia product recovered from dolomite by a deliming process. The term magnesium oxide is meant to cover the oxide and those compounds or mixtures or compounds which yield magnesium oxide on calcination.

To make such a refractory product, if the silica content is low, the magnesite may be crushed to particles about three eighths inch in size and then mixed with a low silica-containing source of iron oxide, such as iron ore or mill scale. Sufficient limestone, dolomite, or lime is added both to react with $SiO_2$ to form dicalcium silicate and to convert the iron oxide and alumina into a calcium ferrite as above disclosed. The advantage in the use of dolomite is that besides supplying the necessary CaO, the product will also be enriched in regard to the magnesia present in the dolomite. This mixture is then fed into a rotary kiln and heated with powdered coal, oil, or gas as a fuel to a temperature of 2550° F. to 2800° F. The carbon dioxide is given off from the magnesite and dolomite and the ingredients in the charge are chemically combined at the temperature used the silica forming dicalcium or tricalcium silicate, the iron oxide and the alumina combining with the CaO to form calcium ferrite, and the magnesium oxide being shrunk and matured into the crystalline form periclase. The calcium ferrite serves a double purpose as a mineralizing agent to bring about early shrinkage of the product and the development of the crystalline form of magnesia known as periclase, and as a clinkering agent or bond to hold the particles of the refractory together. The product issues from the kiln as dense hard clinkered particles, dark brown to black in color, having a weight in clinkered form of about 120 pounds to the cubic foot. Microscopic examination shows the product to consist of comparatively large crystal fragments of periclase, generally rounded, and yellow or brown in color in thin section. These periclase particles are densely packed together, and the interstitial spaces are filled with calcium ferrite, red or brown in color under the microscope in thin section.

It is sometimes desirable to manufacture the periclase refractory by pulverizing the magnesite to a powder 30 mesh or finer, which serves to disseminate the $SiO_2$, or to use the powdered magnesia product recovered from dolomite by a deliming process. The finely powdered magnesite or magnesia product is then mixed with powdered fluxes such as iron oxide and powdered dolomite or lime or limestone, and mixed into a slurry with water. It may be more advantageous to form a slurry by grinding the magnesia and fluxes together in a ball mill or similar grinding equipment. This slurry is then fed into a rotary kiln and calcined to a temperature of 2550° F. to 2800° F. and the product issues from the kiln in nodular clinkered particles about one quarter inch in diameter as before.

Examples of periclase clinkers made by this process are shown by the following analyses:

|  | A | B | C |
|---|---|---|---|
| $SiO_2$ | 1.8 | 1.2 | 2.2 |
| $Al_2O_3$ | 0.9 | 0.7 | 2.0 |
| $Fe_2O_3$ | 6.2 | 4.0 | 7.7 |
| CaO | 8.2 | 5.5 | 10.4 |
| MgO | 82.9 | 88.6 | 77.7 |

A superior refractory product can be produced if periclase is available and is prepared in the form of a granular or pulverized material. The periclase is mixed with calcium ferrite or with lime and iron oxide in proper proportions to produce calcium ferrite. The mixture is then fired to a temperature where the calcium ferrite reacts to bond the periclase particles together.

Depending upon the particular form, the products may be available for various uses. With a grain clinker product, a superior and more permanent refractory is available for building new bottoms and for maintaining and patching old bottoms in basic furnaces. The clinker made by this process because of its homogeneity and non-spalling characteristics is very well adapted for fabrication into brick and other refractory shapes.

Other modes of applying the principle of the invention may be employed, change being made as regards the details disclosed, provided the steps or constituents stated in any of the following claims, or the equivalent of such, be employed.

We therefore particularly point out and distinctly claim as our invention:—

1. As a new article of manufacture a calcined refractory magnesia product comprising magnesia, less than 3% of silica, about 4.7% to about 9.7% of a mixture of iron oxide and alumina, and lime, the amount of said lime being substantially equal to twice the amount of said silica, plus additional lime equal to about 40% to about 70% of said mixture of iron oxide and alumina.

2. A process of making a refractory magnesia product, which comprises firing magnesia with less than 3% of silica, about 4.7% to 9.7% of a mixture of iron oxide and alumina, and lime, the amount of said lime being substantially equal to twice the amount of said silica, plus additional lime equal to about 40% to about 70% of said mixture of iron oxide and alumina.

3. A process of making a refractory magnesia product, which comprises firing magnesia with less than 3% of silica, iron oxide and lime, the amount of said lime being substantially equal to twice the amount of said silica, plus additional lime equal to about 40% to about 70% of said iron oxide, thereby dominantly forming calcium ferrite as the magnesia bond.

4. As new article of manufacture, periclase bonded with calcium ferrite, produced from magnesia, less than 3% of silica, a mixture of iron oxide and alumina, and lime, the amount of said lime being substantially equal to twice the amount of said silica, plus additional lime equal to about 40% to about 70% of said mixture of iron oxide and alumina.

WILLIAM J. McCAUGHEY.
HARLEY C. LEE.